(12) United States Patent
Saito (10) Patent No.: US 10,657,622 B2
(45) Date of Patent: May 19, 2020

(54) CONTROLLING PROJECTED IMAGE FRAME RATE IN RESPONSE TO DETERMINED PROJECTION SURFACE CURVATURE

(71) Applicant: CANON KABUSHIKI KAISHA, Tokyo (JP)

(72) Inventor: Tetsuji Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/043,632

(22) Filed: Jul. 24, 2018

(65) Prior Publication Data
US 2019/0043162 A1  Feb. 7, 2019

(30) Foreign Application Priority Data

Aug. 7, 2017 (JP) .................. 2017-152280

(51) Int. Cl.
| | |
|---|---|
| G06T 3/00 | (2006.01) |
| G09G 3/00 | (2006.01) |
| G06T 3/40 | (2006.01) |
| G09G 3/20 | (2006.01) |

(52) U.S. Cl.
CPC .............. *G06T 3/0093* (2013.01); *G06T 3/40* (2013.01); *G09G 3/001* (2013.01); *G09G 3/002* (2013.01); *G09G 3/2044* (2013.01); *G09G 3/2092* (2013.01); *G09G 2340/04* (2013.01); *G09G 2340/0407* (2013.01); *G09G 2340/0435* (2013.01); *G09G 2354/00* (2013.01); *G09G 2360/12* (2013.01); *G09G 2370/08* (2013.01)

(58) Field of Classification Search
None
See application file for complete search history.

(56) References Cited

U.S. PATENT DOCUMENTS

| | | | |
|---|---|---|---|
| 8,654,132 B2* | 2/2014 | Gorla | G09G 5/363 |
| | | | 345/204 |
| 9,843,689 B1* | 12/2017 | Heller | H04N 1/00267 |
| 2015/0015796 A1* | 1/2015 | Stahl | H04N 9/3179 |
| | | | 348/745 |
| 2017/0178408 A1* | 6/2017 | Bavor, Jr. | G06F 3/013 |

FOREIGN PATENT DOCUMENTS

WO  2008/139577 A1  11/2008

* cited by examiner

*Primary Examiner* — Edward Martello
(74) *Attorney, Agent, or Firm* — Venable LLP (57) ABSTRACT

An information processing apparatus according to the present invention, includes: a first acquiring unit configured to acquire surface change information on magnitude of change of a projection surface onto which an image is projected; and a determining unit configured to determine, based on the surface change information, frame rate control information on a frame rate of image processing to allow the image to follow the projection surface.

15 Claims, 5 Drawing Sheets

SURFACE CHANGE
INFORMATION
0 TO 20

FIG. 2B

SURFACE CHANGE
INFORMATION
21 TO 60

FIG. 2C

SURFACE CHANGE
INFORMATION
61 TO 100

| SURFACE CHANGE INFORMATION | CONTROL INFORMATION ||| UTILIZATION RATE OF FOLLOW-UP BANDWIDTH |
| --- | --- | --- | --- | --- |
| | FRAME RATE | GRADATION | NUMBER OF LATTICE POINTS | |
| 0 TO 20 | 120 FPS | 30 BITS | 2400 POINTS | 100% |
| 21 TO 60 | 480 FPS | 24 BITS | 600 | 100% |
| 61 TO 100 | 960 FPS | 18 BITS | 300 | 100% |

CONTROLLING PROJECTED IMAGE FRAME RATE IN RESPONSE TO DETERMINED PROJECTION SURFACE CURVATURE

BACKGROUND OF THE INVENTION

Field of the Invention

The present invention relates to an information processing apparatus, a projection apparatus, an information processing method and a non-transitory computer readable medium.

Description of the Related Art

In recent years, projection mapping, which projects an image onto a building or the like, is receiving attention and being used for many events. Projection mapping is a technique to implement a spatially augmented reality by combining a projection image (image to be projected) with an actual object, and is already seeing practical use.

A technique, to enhance the presentation effect by performing projection such that the projection image follows the projection object (projection surface) of which position and shape change, is also being developed. For example, in a known technique, projection is performed by driving a high-speed camera and a small mirror at high-speed so that the projection image follows an actual moving object. If this technique is used, projection can be performed as if the projection image were actually printed on the projection surface.

WO 2008/139577 discloses a technique to acquire each coordinate in a projection image by performing interpolation calculation based on the intersections (lattice points) of a plurality of lattices which divide the projection image in a lattice pattern, so as to correct any distortion of the projection image caused by a profile change on the projection surface.

In image processing to transform an image (e.g. distortion correction processing), the disposition of pixels changes, hence the pixels (pixel values) constituting the image after the image processing are generated based on the image before the image processing. For example, the pixels after the image processing are generated by interpolation processing referencing an area (a plurality of pixels; a plurality of pixel values) of the image before the image processing. If conversion of the image size (expansion, reduction), rotation of the image and the like are then implemented, an area that is referred to for interpolation processing further increases. Therefore a frame memory to store images is disposed in the previous stage of the processing unit which performs the interpolation processing, and this processing unit reads an image from the frame memory, and performs the interpolation processing.

The bandwidth of the frame memory considerably depends on the frame rate, gradation, resolution and the like of the image processing. For example, the bandwidth of the frame memory increases as these factors increase.

SUMMARY OF THE INVENTION

For the projection image to follow the projection image at high-speed, it is necessary to increase the image update speed in the follow-up processing (image processing to enable the projection image to follow the projection surface), that is, to increase the frame rate of the follow-up processing. However, the bandwidth of the frame memory has an upper limit, and if the follow-up processing is performed at a high frame rate, the follow-up processing may be performed at an unnecessarily high frame rate and an unnecessarily low resolution, gradation, image processing accuracy or the like, which may be frustrating for the user.

The present invention in its first aspect provides an information processing apparatus, comprising:
a first acquiring unit configured to acquire surface change information on magnitude of change of a projection surface onto which an image is projected; and
a determining unit configured to determine, based on the surface change information, frame rate control information on a frame rate of image processing to allow the image to follow the projection surface.

The present invention in its second aspect provides a projection apparatus, comprising:
an acquiring unit configured to acquire surface change information on magnitude of change of a projection surface onto which an image is projected; and
a determining unit configured to determine, based on the surface change information, frame rate control information on a frame rate of image processing to allow the image to follow the projection surface.

The present invention in its third aspect provides an information processing method, comprising:
acquiring surface change information on magnitude of change of a projection surface onto which an image is projected; and
determining, based on the surface change information, frame rate control information on a frame rate of image processing to allow the image to follow the projection surface.

The present invention in its fourth aspect provides a non-transitory computer readable medium that stores a program, wherein
the program causes a computer to execute:
acquiring surface change information on magnitude of change of a projection surface onto which an image is projected; and
determining, based on the surface change information, frame rate control information on a frame rate of image processing to allow the image to follow the projection surface.

Further features of the present invention will become apparent from the following description of exemplary embodiments with reference to the attached drawings.

DESCRIPTION OF THE EMBODIMENTS

Example 1

Example 1 of the present invention will be described with reference to FIGS. 1 to 6.

In Example 1, surface change information on the magnitude of change (movement, transformation) of the projection surface, onto which an image is projected, is acquired in accordance with an instruction from the user. Based on this surface change information, control information (parameters) on the image processing (follow-up processing), for enabling a projection image (image to be projected) to follow the projection surface, is determined.

The follow-up processing can be regarded as "image processing to transform the projection image so that the projection image follows the projection surface".

Figure 1:
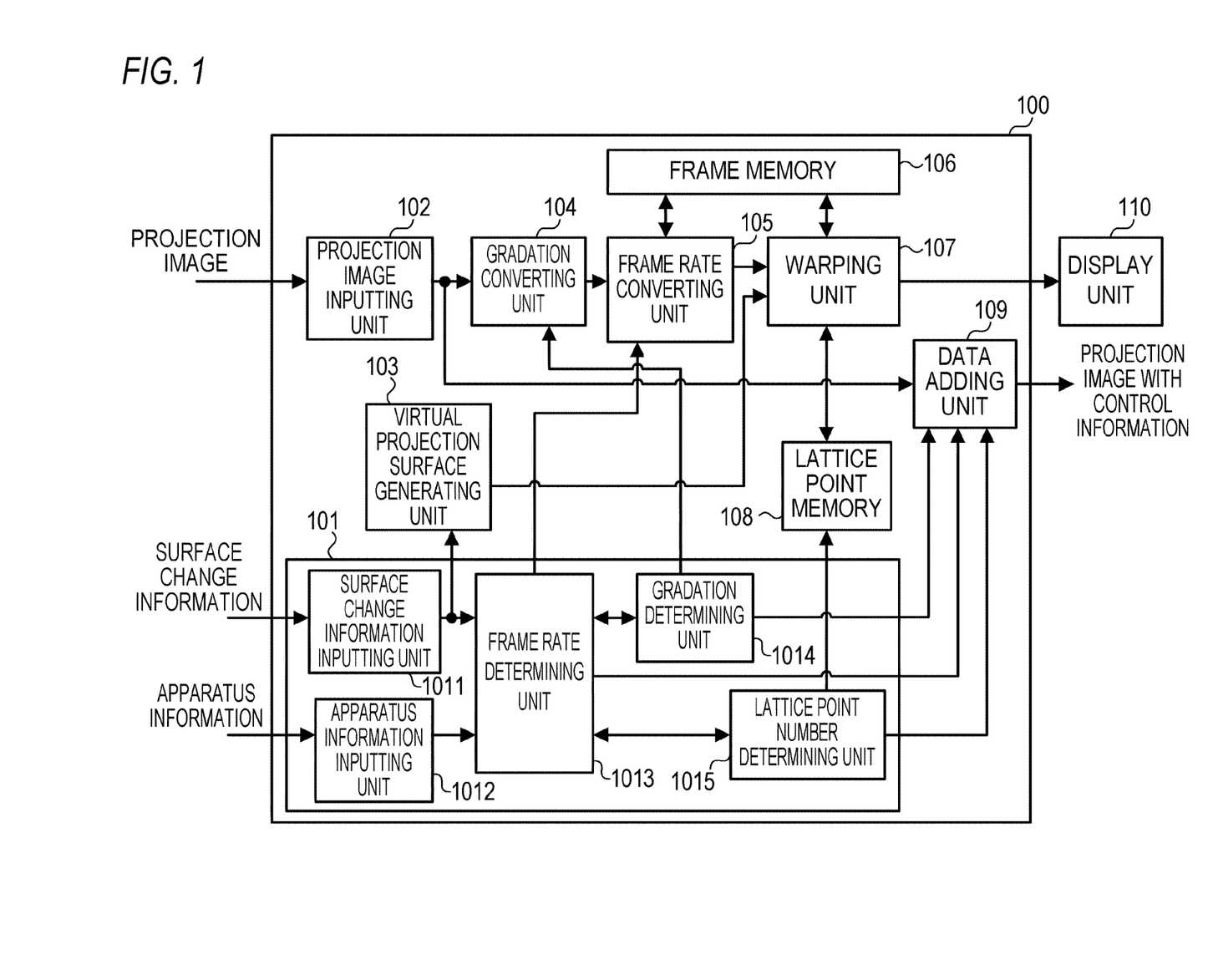
FIG. 1 shows a configuration example of an information processing apparatus according to Example 1.

FIG. 1 shows an example of the functional configuration of an information processing apparatus 100 according to Example 1. The information processing apparatus 100 includes an information determining unit 101, a projection image inputting unit 102, a virtual projection surface generating unit 103, a gradation converting unit 104, a frame rate converting unit 105, a frame memory 106, a warping unit 107, a lattice point memory 108 and a data adding unit 109. The information determining unit 101 includes a surface change information inputting unit 1011, an apparatus information inputting unit 1012, a frame rate determining unit 1013, a gradation determining unit 1014, and a lattice point number determining unit 1015.

The information processing apparatus 100 also includes a control unit (not illustrated) which controls the processing of each functional unit of the information processing apparatus 100, and the control unit is connected to each functional unit via a control bus (not illustrated). Furthermore, the information processing apparatus 100 is connected to the display unit 110.

The information processing apparatus 100 can preview the state of projecting an image on a projection surface on the display unit 110. The user instructs the change (adjustment) of the control information on the follow-up processing while checking the virtual projection surface displayed on the display unit 110, and the projection image which is superimposed on the virtual projection surface.

A part of the plurality of functional units of the information processing apparatus 100 may be disposed in an apparatus that is separate from the information processing apparatus 100. For example, the information processing apparatus 100 may include only the information determining unit 101. And the display unit 110 may be a part of the information processing apparatus 100.

Each functional unit of the information processing apparatus 100 will be described with reference to FIG. 1. Responding to the instruction from the user, the information determining unit 101 acquires the surface change information and apparatus information on a processing apparatus which performs the follow-up processing. In Example 1, the surface change information is a value of at least 0 and not more than 100, indicating the magnitude (expected value) of the change of the projection surface per unit time, and the apparatus information includes a model number of a projection apparatus (projector), which performs projection such that the projection image follows the projection surface. The user instructs to input the surface change information and apparatus information to the information determining unit 101 using an operation unit (not illustrated). For example, a dedicated graphical user interface (GUI) is displayed on the display unit 110, and the user instructs (inputs) information using the GUI.

Then in accordance with the surface change information and apparatus information, the information determining unit 101 determines the frame rate control information, gradation control information, and lattice point control information. The frame rate control information is control information on the followability of the projection image to the projection surface, and is control information on the frame rate of the follow-up processing, for example. The gradation control information is control information on the gradation of the image for which the follow-up processing is performed. The lattice point control information is control information on the accuracy of the follow-up processing, and is control information on the number of lattice points used for the follow-up processing, for example. The information determining unit 101 changes at least one of the frame rate control information, the gradation control information, and the lattice point control information in accordance with the instruction from the user.

The methods of acquiring the surface change information and apparatus information are not limited to the above methods. For example, a data file created by a specific format may be input to the information determining unit 101 as the surface change information and apparatus information. The surface change information is not limited to the information that indicates the magnitude of the change of the projection surface per unit time, and is not limited to a value that is at least 0 and not more than 100. The apparatus information is not limited to the model number of the projection apparatus. For example, the apparatus information may be other information that indicates the processing capability of the projection apparatus. In concrete terms, the apparatus information may be the operating frequency of the projection apparatus, memory band, maximum frame rate, software processing capability or the like. The apparatus information may be information related to a processing apparatus that is different from the projection apparatus.

The projection image inputting unit 102 acquires the projection image (image data of projection image; projection image data). For example, the projection image is input to the projection image inputting unit 102 from an external device, such as a personal computer, file server, and cloud-based storage, via cable. The projection image may be input from an external device to the projection image inputting unit 102 wirelessly. The projection image inputting unit 102 may select one of a plurality of images stored in an external device, and acquire the selected image from the external device as a projection image. The projection image may be a still image or a moving image. In Example 1, to simplify description, it is assumed that the projection image is a still image.

The virtual projection surface generating unit 103 generates an image on the virtual projection surface (image data) in accordance with the surface change information acquired by the information determining unit 101.

The gradation converting unit 104 performs the gradation conversion processing in accordance with the gradation control information determined by the information determining unit 101, on the projection image acquired by the projection image inputting unit 102. The gradation conversion processing is dither processing, limit processing or the like, for example. In Example 1, a case of performing dither processing as the gradation conversion processing will be described. By the gradation converting unit 104 performing the gradation conversion processing, the gradation of the image is converted into a gradation corresponding to the gradation control information.

The frame rate converting unit 105 performs frame rate conversion processing, corresponding to the frame rate control information determined by the information determining unit 101, on the image generated by the gradation converting unit 104 (image after the gradation conversion processing). By the frame rate converting unit 105 performing the frame rate conversion processing, the frame rate of the image is converted into a frame rate corresponding to the frame rate control information.

In concrete terms, the frame rate converting unit 105 writes (buffers) each frame of the image, which was generated by the gradation converting unit 104, into the frame memory 106 in accordance with the synchronizing signal of this image (frame rate before conversion). Then the frame rate converting unit 105 reads and outputs each frame from the frame memory 106 in accordance with the synchronizing signal generated in accordance with the frame rate control information (frame rate after conversion). In the frame rate conversion processing to increase the frame rate, the same frame is read from the frame memory 106 for a plurality of times. For example, in the case of the frame rate conversion processing to convert 120 fps to 240 fps, each frame is read from the frame memory 106 twice respectively.

The frame memory 106 is synchronous dynamic random access memory (SDRAM), for example, and stores the frames of the image generated by the gradation converting unit 104. The frame memory 106 is used for the processing by the frame rate converting unit 105 and the processing by the warping unit 107.

The warping unit 107 performs the follow-up processing, corresponding to the lattice point control information determined by the information determining unit 101, on the image generated by the frame rate converting unit 105 (image after frame rate conversion processing). In concrete terms, the warping unit 107, performs the warping processing, as the follow-up processing, using the number of lattice points corresponding to the lattice point control information. The warping unit 107 can perform the warping processing using 2400 lattice points at 120 fps.

In Example 1, the warping unit 107 calculates the coordinates of the lattice points after movement based on the coordinates of the intersecting points (lattice points) of a plurality of lattices, which divide the image before the warping processing in a lattice pattern, and the virtual projection surface generated by the virtual projection surface generating unit 103. Then the warping unit 107 stores (records) the calculated coordinates in the lattice point memory 108. Here "movement" refers to the movement of the lattice points for the projection image to follow the virtual projection surface.

The warping unit 107 calculates the coordinates of the points between the lattice points by interpolation calculation based on the coordinates of the lattice points. Then the warping unit 107 generates the pixels (pixel values) at the coordinates between the lattice points after movement, by interpolation processing using the images stored in the frame memory 106. Thereby the image after warping processing (warping image) is generated.

The warping unit 107 outputs the composite image, generated by superimposing the generated warping image on the virtual projection surface (composite image data), to the display unit 110.

The method of the warping processing is not especially limited. For the method of the warping processing, various methods which have been proposed can be used. The processing performance of the warping unit 107 may be higher or lower than the processing performance to perform the warping processing using 2400 lattice points at 120 fps.

In Example 1, a plurality of pieces of information corresponding to a plurality of projection apparatuses respectively are recorded in ROM or cloud (cloud storage) (not illustrated), as the processing method information to indicate the methods of the gradation conversion processing and the warping processing. The control unit (not illustrated) acquires, from the storage, the processing method information of the projection apparatus corresponding to the apparatus information. Then the control unit sets the method indicated by the acquired processing method information in the gradation converting unit 104 and the warping unit 107. As a result, the information processing apparatus 100 performs the gradation conversion processing and warping processing using a same method as the method of the projection apparatus corresponding to the apparatus information.

The lattice point memory 108 stores the coordinates of the lattice points after the movement in the warping processing.

The data adding unit 109 adds, as meta data, the control information determined by the information determining unit 101 to the projection image data acquired by the projection image inputting unit 102. Then the data adding unit 109 outputs the image data added with the control information, to the outside. The control information may be output to the outside without being added to the projection image data. The control information and the projection image data may be output to the outside independently, or only the control information may be output to the outside.

The display unit 110 displays the composite image generated by superimposing the warping image on the virtual projection surface. The user can check the followability, gradation, accuracy and the like of the warping processing by checking the composite image displayed on the display unit 110. The user can also check the validity of the surface change information (magnitude of the change of the virtual projection surface). Further, the display unit 110 displays a user interface, such as a GUI.

Each functional unit of the information determining unit 101 will be described next with reference to FIG. 1. The surface change information inputting unit 1011 acquires the surface change information (a value of at least 0 and not more than 100) in accordance with the instruction from the user. Then the surface change information inputting unit 1011 outputs the surface change information to the virtual projection surface generating unit 103, the frame rate determining unit 1013, the gradation determining unit 1014, and the lattice point number determining unit 1015. In FIG. 1, the data paths from the surface change information inputting unit 1011 to the gradation determining unit 1014 and the lattice point number determining unit 1015 are omitted.

The apparatus information inputting unit 1012 acquires the apparatus information (model number) in accordance with the instruction from the user, and outputs the apparatus information to the frame rate determining unit 1013, the gradation determining unit 1014, and the lattice point number determining unit 1015. In FIG. 1, the data paths from the apparatus information inputting unit 1012 to the gradation determining unit 1014 and the lattice point number determining unit 1015 are omitted.

The frame rate determining unit 1013 determines the frame rate control information in accordance with the surface change information and the apparatus information, and outputs the frame rate control information to the frame rate converting unit 105 and the data adding unit 109. The gradation determining unit 1014 determines the gradation control information in accordance with the surface change information and apparatus information, and outputs the gradation control information to the gradation converting unit 104 and the data adding unit 109. The lattice point number determining unit 1015 determines the lattice point control information in accordance with the surface change information and the apparatus information, and outputs the lattice point control information to the warping unit 107 and the data adding unit 109.

Figure 2A:
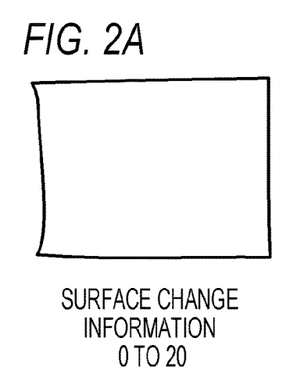
FIGS. 2A to 2C show examples of surface change information according to Example 1.
Figure 2B:
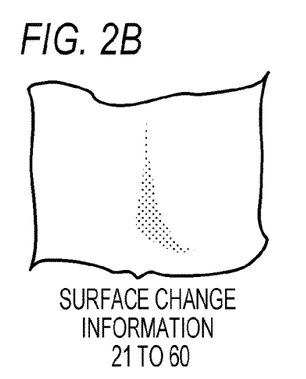
Figure 2C:
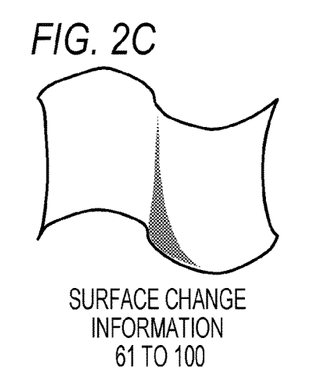

The surface change information will be described next with reference to FIGS. 2A to 2C. FIGS. 2A to 2C are illustrations for describing the surface change information. As illustrated, when the projection surface, such as a flag or cloth, is moved by wind or the like, the projection surface transforms. Here an example of the surface change information related to the magnitude of the transformation of the projection surface will be described. The transformation of the projection surface, however, need not occur. The surface change information may be information on the magnitude of the movement of the projection surface.

FIG. 2A shows a state when the transformation (change) of the projection surface is very small. In the state shown in FIG. 2A, a value of at least 0 and not more than 20 is specified as the surface change information. FIG. 2B shows a state when the transformation of the projection surface is relatively large. In the state shown in FIG. 2B, a value of at least 21 and not more than 60 is specified as the surface change information. FIG. 2C shows a state when the transformation of the projection surface is very large. In the state shown in FIG. 2C, a value of at least 61 and not more than 100 is specified as the surface change information. In this way, the surface change information (value) corresponding to the transformation is larger as the transformation of the projection surface is larger.

On the display unit 110, a virtual projection surface in one of the states shown in FIGS. 2A to 2C is displayed as a moving image, in accordance with the acquired (input) surface change information. The user checks the moving image of the virtual projection surface, and adjusts the surface change information so that a virtual projection surface does not deviate from the anticipated projection surface.

The three states shown in FIGS. 2A to 2C are the states of the projection surface, but the number of states (magnitudes of change) of the projection surface may be more or less than three.

Figure 3:
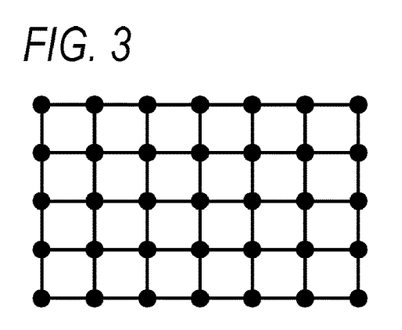
FIG. 3 shows an example of lattice points according to Example 1.

A concrete example of the processing by the warping unit 107 will be described next with reference to FIG. 3, and FIGS. 4A and 4B. FIG. 3 is a diagram depicting the relationship between the projection image (image before warping processing) and the lattice points. FIG. 3 shows 35 lattice points (black dots in FIG. 3), such that the entire region of the projection image is divided into 24 regions (6 horizontally×4 vertically). The number of lattice points may be more or less than 35.

Figure 4A:
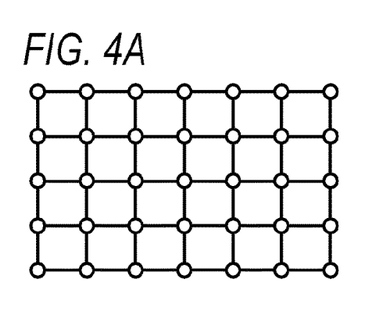
FIGS. 4A and 4B show examples of invisible markers according to Example 1.
Figure 4B:
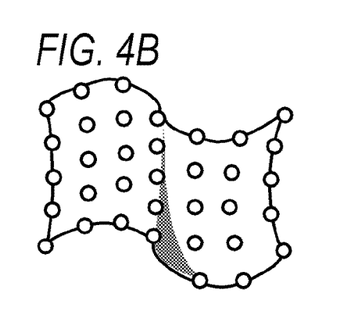

FIG. 4A shows the virtual projection surface before the transformation, and FIG. 4B shows the virtual projection surface after the transformation. The white circles in FIGS. 4A and 4B are invisible markers. Each invisible marker corresponds to a coordinate, and has a shape and color which are different from those of other invisible markers. The virtual projection surfaces of FIGS. 4A and 4B are generated by the virtual projection surface generating unit 103.

The warping unit 107 calculates the coordinates of the lattice points after movement, as the invisible markers are moved by the transformation of the virtual projection surface, based on the coordinates of the invisible markers in FIG. 4A and the coordinates of the invisible markers in FIG. 4B. The warping unit 107 calculates the coordinates between the lattice points after movement, by the interpolation calculation based on the coordinates of the lattice points after movement. Then the warping unit 107 generates the pixels (pixel values) at the coordinates between the lattice points after movement, by the interpolation calculation using the images stored in the frame memory 106. Thereby the warping image is generated.

A concrete example of the processing by the information determining unit 101 will be described next, with reference to FIG. 5. The frame rate and the gradation of the warping processing influence the memory bandwidth (bandwidth to be used) of the frame memory. Further, the number of lattice points used in the warping processing influences the processing time of the warping processing. Therefore the frame rate determining unit 1013, the gradation determining unit 1014 and the lattice point number determining unit 1015 perform cooperative processing, so that the balance among the frame rate, the gradation and the number of lattice points is determined in accordance with the surface change information and the apparatus information. The information determining unit 101 (frame rate determining unit 1013, gradation determining unit 1014 and lattice point number determining unit 1015) individually determine the frame rate, the gradation and the number of lattice points (frame rate control information, gradation control information, lattice point control information) for each frame.

In Example 1, the information determining unit 101 determines the frame rate, the gradation and the number of lattice points, so that the processing load of the warping processing performed by the warping unit 107 becomes a threshold or less. The threshold is determined in accordance with the processing capability of the projection apparatus corresponding to the apparatus information (projection apparatus that performs projection, so that the projection image follows the projection surface). The information determining unit 101 determines the frame rate, the gradation and the number of lattice points corresponding to the warping processing which can be implemented by the projection apparatus.

Figure 5:
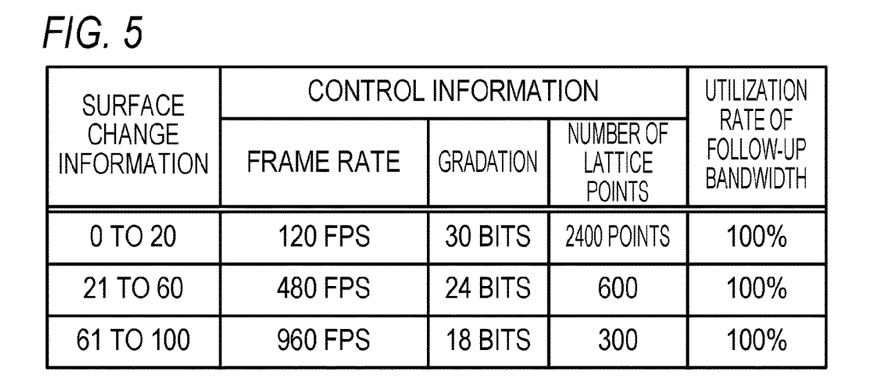
FIG. 5 shows an example of the control information according to Example 1.

The table in FIG. 5 indicates the relationship between the control information (parameters) and the surface change information determined by the information determining unit 101. In the case of FIG. 5, RGB data is assumed as the image data, and a total of the number of bits of the R value, the number of bits of the G value and the number of bits of the B value is used as the gradation. FIG. 5 also indicates the utilization rate of a follow-up bandwidth. The follow-up bandwidth is a bandwidth which can be used for the warping processing, out of the entire memory bandwidth of the projection apparatus corresponding to the apparatus information. This projection apparatus can implement the warping processing if the utilization rate of the follow-up bandwidth is 100% or less. Hence, a value corresponding to the 100% or less utilization rate is used as the threshold. The information determining unit 101 acquires information, such as the follow-up bandwidth and the relationship between the number of lattice points and the processing time of the warping processing, from ROM or cloud storage (not illustrated) in accordance with the apparatus information.

In terms of followability, it is preferable that the frame rate is higher as the change of the projection surface is larger. Therefore according to the table in FIG. 5, the higher frame rate is determined as the surface change information increases. Then the gradation (bits) is decreased as the frame rate increases, so that the utilization rate of the follow-up bandwidth becomes 100%. Further, the number of lattice points is decreased as the frame rate increases, since time that can be used for one warping processing (one frame of warping processing) decreases as the frame rate is higher.

In concrete terms, if the surface change information is at least 0 and not more than 20, the information determining unit 101 determines that the frame rate is 120 fps, the gradation is 30 bits, and the number of lattice points is 2400. If the surface change information is at least 21 and not more than 60, the information determining unit 101 determines that the frame rate is 480 fps, the gradation is 24 bits, and the number of lattice points is 600. If the surface change information is at least 61 and not more than 100, the information determining unit 101 determines that the frame rate is 960 fps, the gradation is 18 bits, and the number of lattice points is 300.

In Example 1, a plurality of tables (e.g. table in FIG. 5), which correspond to a plurality of projection apparatuses respectively, are recorded in ROM or cloud storage (not illustrated) in advance. The information determining unit 101 reads the control information corresponding to the acquired surface change information, from a table corresponding to the projection apparatus indicated in the apparatus information.

Figure 6:
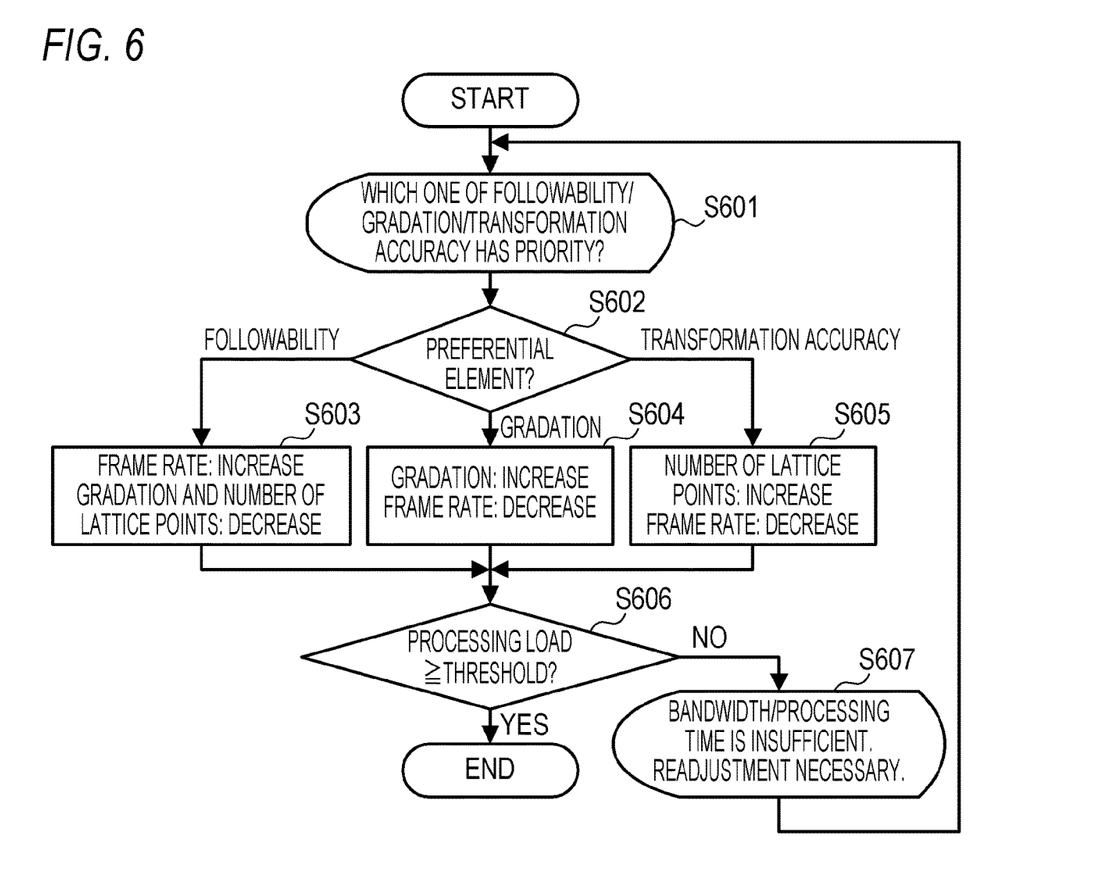
FIG. 6 shows an example of the processing flow according to Example 1.

A concrete example of another processing by the information determining unit 101 will be described next, with reference to FIG. 6. The flow chart in FIG. 6 depicts a processing flow in the case when the user instructed to change the determined control information. Each processing flow in FIG. 6 is started by the control unit (not illustrated). The processing flow in FIG. 6 is started when the control information is determined in accordance with the surface change information and the apparatus information. Here it is assumed that the surface change information is a value of at least 21 and not more than 60, and it is assumed to be determined that the frame rate is 480 fps, the gradation is 24 bits, and the number of lattice points is 600.

In S601, the control unit prompts the user to select a preferential element, out of three elements, of the followability, the gradation and the transformation accuracy. In concrete terms, the control unit performs control so that the display unit 110 displays a message to ask the user for a preferential element. The followability, out of the three elements, corresponds to the frame rate of the warping processing, that is, the updating rate of the projection image (updating speed). The gradation, out of the three elements, corresponds to the gradation (number of bits) of the image for which the warping processing is performed. The transformation accuracy, out of the three elements, corresponds to the accuracy of the warping processing, that is, corresponds to the number of lattice points used for the warping processing.

In S602, the control unit determines the element which the user selected in the processing in S601 (the preferential element). If the followability is selected, processing advances to S603, if the gradation is selected, processing advances to S604, and if the transformation accuracy is selected, processing advances to S605. The preferential element is selected using an operation unit (not illustrated), for example.

In S603, the control unit performs processing to increase the frame rate (frame rate control information) to assign priority to the followability of the warping processing. In S603, the control unit also performs processing to decrease the number of bits (gradation control information), so that the utilization rate of the follow-up bandwidth becomes 100% or less. Further, the control unit performs processing to decrease the number of lattice points (lattice point control information), so that the time required for one warping processing (one frame of warping processing) becomes shorter than the time corresponding to the increased frame rate. The processing to decrease the number of lattice points can be regarded as a "processing to skip lattice points". In concrete terms, the control unit changes the control information from the control information corresponding to the surface change information of at least 21 and not more than 60 to the surface change information of at least 61 and not more than 100 (FIG. 3).

In S604, the control unit performs processing to increase the number of bits (gradation control information) to assign priority to the gradation of the warping processing. In S604, the control unit also performs processing to decrease the frame rate (frame rate control information), so that the utilization rate of the follow-up bandwidth becomes 100% or less. In concrete terms, the control unit changes the control information from the control information corresponding to the surface change information of at least 21 and not more than 60 to the control information corresponding to the surface change information that of at least 0 and not more than 20 (FIG. 3).

In S604, the control unit performs processing to increase the number of lattice points (lattice point control information) to assign priority to the accuracy of the warping processing. The control unit also performs processing to decrease the frame rate (frame rate control information), so that the time corresponding to the frame rate becomes longer than the time required for one warping processing (one frame of warping processing). In concrete terms, the control unit changes the control information from the control information corresponding to the surface change information, of at least 21 and not more than 60 to the control information corresponding to the surface change information of at least 0 and not more than 20 (FIG. 3).

The control information after the change may or may not be automatically determined by the control unit. For example, the control information after the change (e.g. frame rate, gradation, the number of lattice points) may be determined as instructed by the user. All control information may be changed as instructed by the user, or only a part of the control information may be changed as instructed by the user.

In S606, after S603, S604 or S605, the control unit determines whether the processing load of the warping processing, based on the plurality of pieces of control information after the change, is greater than the threshold. In concrete terms, the control unit determines whether both the following Conditions 1 and 2 are satisfied. If it is determined that both Conditions 1 and 2 are satisfied, the control unit ends this processing flow. If it is determined that at least one of Conditions 1 and 2 is not satisfied, processing advances to S607. The threshold to compare with the time required for the warping processing is one frame of time at the maximum, but this depends on other processing performed together with the warping processing.

Condition 1: The utilization rate based on the frame rate and gradation after the change (utilization rate of follow-up bandwidth) is 100% or less.

Condition 2: The time required for one warping processing (one frame of warping processing) based on the number of lattice points after the change is the threshold or less.

In S607, the control unit performs control to provide a predetermined notification. In concrete terms, the control unit performs control so that the display unit 110 displays a message to notify that the bandwidth or processing time is insufficient. Then processing returns to S601.

As described above, according to Example 1, the control information, such as the frame rate control information, is determined based on the surface change information. By applying the determined control information, a more appropriate projection image can be displayed on the projection surface. In concrete terms, the follow-up processing can be performed to prevent the use of an unnecessarily high frame rate, or an unnecessarily low resolution, gradation, image processing accuracy or the like.

The control information is not limited to the frame rate control information, the gradation control information, and the lattice point control information. For example, the resolution (image size) of the image on which the warping processing is performed also influences the memory bandwidth (bandwidth to be used) of the frame memory. Therefore the resolution control information on the resolution may be determined based on the surface change information. In this case, a resolution converting unit is disposed in the previous stage of the frame rate converting unit 105. The resolution converting unit converts the resolution of the image into a resolution corresponding to the resolution control information. The resolution converting unit performs a reducing processing to reduce the image or an enlarging processing to enlarge the image. Then the warping unit 107 performs the warping processing while returning the resolution of the image read from the frame memory (resolution after conversion) back to the original resolution (resolution before conversion). At least one of the gradation control information, the lattice point control information and the resolution control information need not be determined.

The follow-up processing is not limited to the warping processing. For example, the trapezoidal distortion correction processing (keystone correction processing) may be performed as the follow-up processing. In the case of the trapezoidal distortion correction processing, the image is transformed based on the lattice points at four corners of the image, for example. Since the number of lattice points is very low in the trapezoidal distortion correction processing, it is not always necessary to consider the processing time of the follow-up processing, the number of lattice points and the like. In other words, the lattice point control information need not be determined.

The processing apparatus (projection apparatus) that performs the follow-up processing is a fixed apparatus determined in advance, and a fixed table may be provided in advance as the table in FIG. 5. Then using this table provided in advance, the above processing can be implemented. The apparatus information need not always be acquired or used. The table in FIG. 5 may be acquired as the apparatus information.

Example 2

Example 2 of the present invention will be described next with reference to FIGS. 7 and 8. In Example 2, the information processing apparatus described in Example 1 is disposed in a projection apparatus, and the projection apparatus automatically switches the control information to be used for the follow-up processing. In the following, aspects (configuration and processing) that are different from Example 1 will be described in detail, and description on aspects the same as Example 1 will be omitted.

Figure 7:
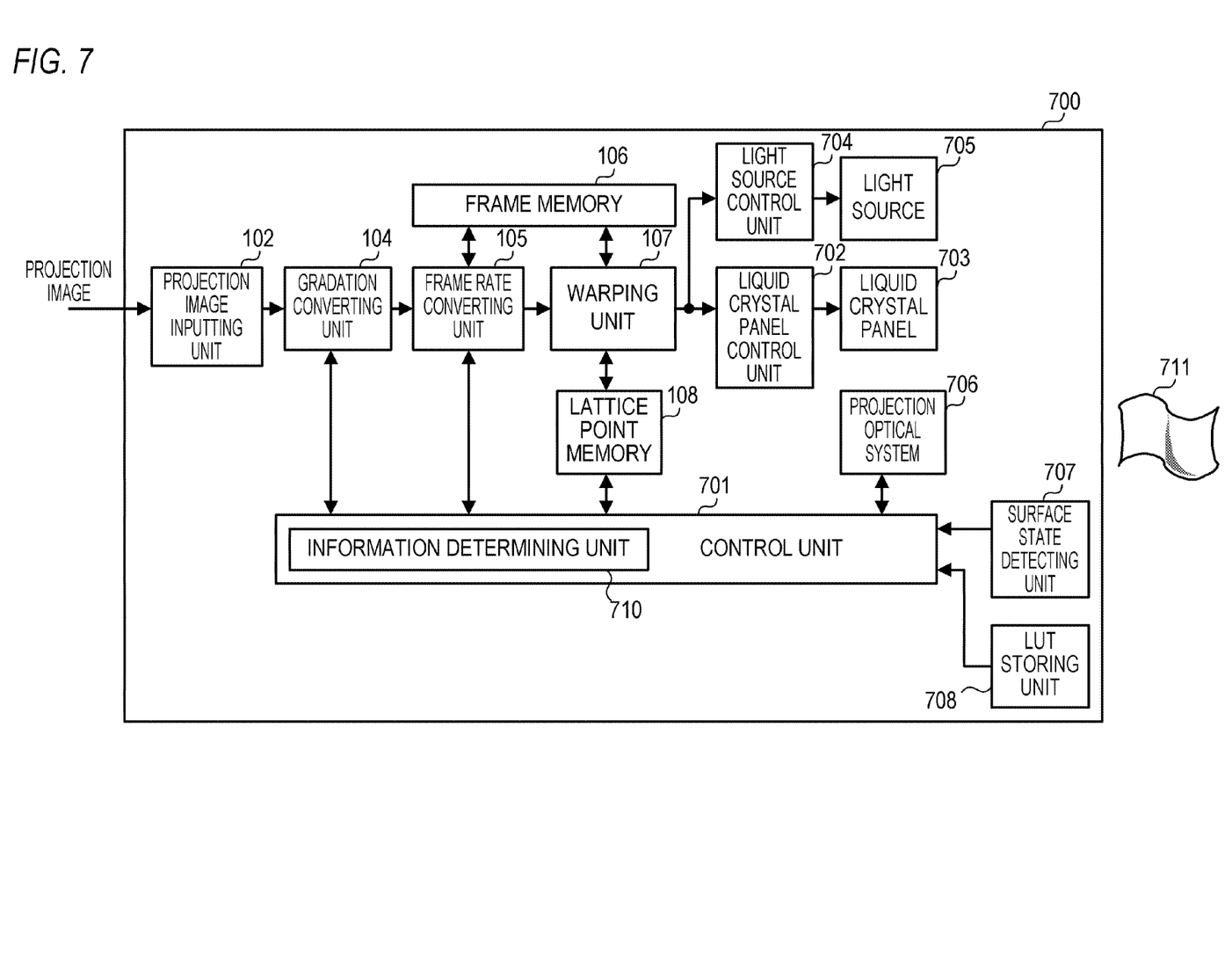
FIG. 7 shows a configuration example of a projection apparatus according to Example 2.
Figure 8:
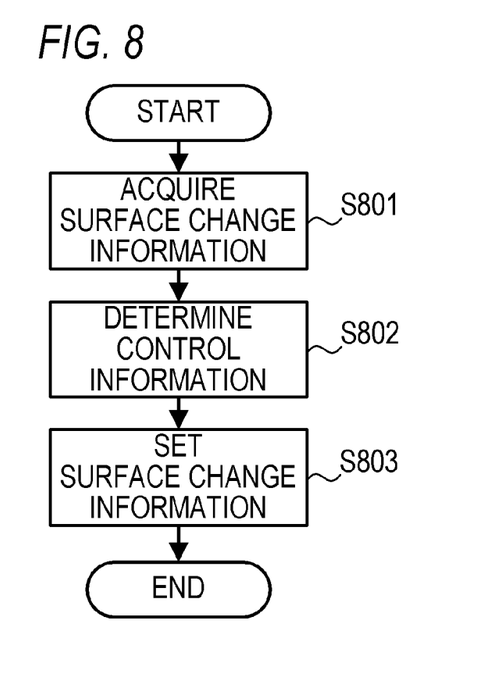
FIG. 8 shows an example of the processing flow according to Example 2.

FIG. 7 shows an example of the functional configuration of a projection apparatus 700 according to Example 2. In FIG. 7, a function unit that is the same as Example 1 (FIG. 1) is denoted with the same reference sign as Example 1. The projection apparatus 700 includes the projection image inputting unit 102, the gradation converting unit 104, the frame rate converting unit 105, the frame memory 106, the warping unit 107, and the lattice point memory 108. The projection apparatus 700 also includes a control unit 701, a liquid crystal panel control unit 702, a liquid crystal panel 703, a light source control unit 704, a light source 705, a projection optical system 706, a surface state detecting unit 707, and an LUT storing unit 708. The control unit 701 includes an information determining unit 710.

The projection surface 711 is a projection surface that can be transformed, such as a projection surface made of cloth. The projection apparatus 700 performs projection such that the image follows up the projection surface 711. Invisible markers are attached to the projection surface 711, as shown in FIGS. 4A and 4B. The data format of the projection image that is input to the projection apparatus 700 is not especially limited, but in Example 2, it is assumed that the projection image has the following data format.

Resolution: 1920 pixels horizontally×1080 pixels vertically

Pixel values: total of 30-bit RGB values constituted by a 10-bit R value, a 10-bit G value, and a 10-bit B value Frame rate: 120 fps Each functional unit of the projection apparatus 700 will be described with reference to FIG. 7. The LUT storing unit 708 stores a table in FIG. 5, for example, in advance. The table stored by the LUT storing unit 708 is a table corresponding to the projection apparatus 700.

The surface state detecting unit 707 is a sensor which can detect the state of the projection surface 711, and includes a camera, for example. The camera of the surface state detecting unit 707 is preferably a camera which can perform high-speed photography, and a camera which can photograph at 1000 fps is used in Example 2. The surface state detecting unit 707 generates the surface change information based on the result of detecting the state of the projection surface 711.

The method of generating the surface change information is not especially limited, but in Example 2, the surface state detecting unit 707 calculates the magnitude of the change of the projection surface 711 per unit time (e.g. 1 second) based on the result of detecting the state of the projection surface 711. Then the surface state detecting unit 707 generates the surface change information based on the calculation result.

The method of generating the surface change information will be described using a concrete example. Here it is assumed that the unit of time is 1 second. The surface state detecting unit 707 calculates the difference value (change amount) of the positions between frames for each of the plurality of invisible markers. Then the surface state detecting unit 707 calculates the total of the plurality of difference values as the statistical difference value, and records the statistical difference value in memory (not illustrated). The surface state detecting unit 707 repeats the processing of adding the calculated statistical difference value to the statistic difference value in the memory for 1 second (cumulative addition), so that the total of a plurality of the statistical difference values acquired for 1 second (total statistical difference value) is acquired. In Example 2, the frame rate of the camera of the surface state detecting unit 707 is 1000 fps, therefore the cumulative addition of the statistical difference value is performed 1000 times per second. As the magnitude of the change of the projection surface 711 is greater, a greater total statistical difference value is acquired.

Then the surface state detecting unit 707 calculates (updates) the surface change information from the total statistical difference value once every 1 second. In Example 2, the surface state detecting unit 707 calculates the surface change information by normalizing the total statistical difference value to a value of at least 0 and not more than 100.

The information determining unit 710 has similar functions as the information determining unit 101 of Example 1. However, the information determining unit 710 determines the control information (frame rate control information, gradation control information, and lattice point control information) based on the surface change information acquired from the surface state detecting unit 707, without acquiring the apparatus information. In concrete terms, the information determining unit 710 reads the control information in accordance with the surface change information from a table stored in the LUT storing unit 708.

The liquid crystal panel control unit 702 generates an electric signal (e.g. voltage signal) for controlling the transmittance of the liquid crystal panel 703 based on the warping image generated by the warping unit 107. The liquid crystal panel 703 transmits through the light emitted from the light source 705 at a transmittance based on the electric signal generated by the liquid crystal panel control unit 702.

The light source control unit 704 generates the control values to control the ON/OFF of the light source 705, the light quantity of the light source 705 and the like, based on the warping image and the instructions which the user input via the operation unit (not illustrated) and the like. The light source 705 is a halogen lamp, a xenon lamp, or a high pressure mercury lamp, for example, and irradiates light onto the liquid crystal panel 703 based on the control value generated by the light source control unit 704.

The projection optical system 706 has a projection lens, and irradiates (projects) the light, transmitted through the liquid crystal panel 703, onto the projection surface 711. The projection lens is a lens set which includes a plurality of lenses, such as a zoom lens and a focus lens, in a cylindrical lane barrel.

The control unit 701 controls the processing of each functional unit of the projection apparatus 700. For example, the state of each lens of the projection optical system 706 is controlled in accordance with the instruction from the control unit 701.

A concrete example of the processing by the projection apparatus 700 (control unit 701) will be described next with reference to FIG. 8. The flow chart in FIG. 8 starts when the installation of the projection surface 711 and the projection apparatus 700 ends, and a follow-up projection mode of the projection apparatus 700 becomes ON. The follow-up projection mode is an operation mode to perform projection such that the image follows the projection surface 711. The processing flow in FIG. 8 may be performed only once, or may be performed repeatedly at a predetermined frequency. The processing flow in FIG. 8 may be performed at every predetermined unit time, or may be performed at every time when time longer or shorter than the unit time elapses.

In S801, the control unit 701 instructs the surface state detecting unit 707 to calculate the surface change information, and acquires the surface change information from the surface state detecting unit 707. Here a case when 70 is acquired as the surface change information will be described.

In S802, the control unit 701 determines the control information based on the surface change information acquired in S801. Here 70 is acquired as the surface change information, hence based on the table in FIG. 5, 960 fps is determined as the frame rate (frame rate control information), 18 bits is determined as the gradation (gradation control information), and 300 is determined as the number of lattice points (lattice point control information).

In S803, the control unit 701 sets the control information determined in S802 for each functional unit. Here the control unit 701 outputs an instruction to the gradation converting unit 104 so that the number of bits of each of the R value, G value and B value changes from 10 bits to 6 (=18/3) bits. Further, the control unit 701 instructs the frame rate converting unit 105 to convert the frame rate from 120 fps to 960 fps. Then the control unit 701 instructs the warping unit 107 to perform the warping processing for 300 lattice points.

As described above, according to Example 2, the processing the same as Example 1 is performed by the projection apparatus, hence the same effects as Example 1 can be implemented. Further, the state of the projection surface is detected, and the surface change information based on this detection result is used, therefore optimum control information in accordance with the projection surface can be automatically determined, and optimum image processing in accordance with the projection surface can be performed.

Each functional unit of Examples 1 and 2 may or may not be independent hardware. The functions of at least two functional units may be implemented by common hardware. Each of a plurality of functions of one functional unit may be implemented by independent hardware respectively. At least two functions of one functional unit may be implemented by common hardware. Each functional unit may or may not be implemented by hardware. For example, an apparatus may include a processor and a memory storing a control program. Thereby the functions of at least a part of the functional units of the apparatus may be implemented by the processor reading the control program from the memory, and executing the control program.

Examples 1 and 2 are merely examples, and configurations acquired by appropriately modifying or changing the configurations of Examples 1 and 2 within the scope of the essence of the present invention are included in the present invention. Configurations acquired by appropriately combining the configurations of Examples 1 and 2 are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-152280, filed on Aug. 7, 2017, which is hereby incorporated by reference herein in its entirety.

What is claimed is:

1. An information processing apparatus comprising at least one memory and at least one processor which function as a plurality of units comprising:
   (1) a first acquiring unit configured to acquire surface change information on magnitude of change of a projection surface onto which an image is projected;
   (2) a determining unit configured to determine, based on the surface change information, (a) frame rate control information on a frame rate of image processing for maintaining correspondence between each position in the image and each position on the projection surface, (b) gradation control information on a number of bits of an image for which the image processing is performed, and (c) lattice point control information on a number of lattice points that are used for the image processing; and
   (3) a selection unit configured to allow a user to select followability of the image processing, gradation of the image processing, or transformation accuracy of the image processing,
   wherein in a case where the followability is selected by the user, the determining unit changes the frame rate control information, the gradation control information, and the lattice point control information which are determined based on the surface change information, so that the frame rate is increased, the number of bits is decreased, and the number of lattice points is decreased,
   wherein in a case where the gradation is selected by the user, the determining unit changes the frame rate control information, the gradation control information, and the lattice point control information which are determined based on the surface change information, so that the number of bits is increased, the frame rate is decreased, and the number of lattice points is decreased, and
   wherein in a case where the transformation accuracy is selected by the user, the determining unit changes the frame rate control information, the gradation control information, and the lattice point control information which are determined based on the surface change information, so that the number of lattice points is increased, the frame rate is decreased, and the number of bits is decreased.

2. The image processing apparatus according to claim 1, wherein the determining unit further determines, based on the surface change information, resolution control information on resolution of the image for which the image processing is performed.

3. The information processing apparatus according to claim 1, wherein the determining unit determines, based on the surface change information, a plurality of control information including the frame rate control information, and changes at least one of the plurality of control information in accordance with an instruction from a user.

4. The information processing apparatus according to claim 3, wherein the determining unit changes at least one of the plurality of control information in accordance with the instruction, so that a processing load of the image processing becomes a threshold or less.

5. The information processing apparatus according to claim 3, wherein the at least one memory and at least one processor further function as a notifying unit configured to provide a predetermined notification in a case where a processing load of the image processing based on the plurality of control information after the change in accordance with the instruction is greater than a threshold.

6. The information processing apparatus according to claim 1, wherein the determining unit determines, based on the surface change information, a plurality of control information including the frame rate control information, so that a processing load of the image processing becomes a threshold or less.

7. The information processing apparatus according to claim 4, wherein the threshold is determined in accordance with a processing capability of a processing apparatus which performs the image processing, and
   wherein the determining unit determines a plurality of control information corresponding to image processing that can be implemented by the processing apparatus.

8. The information processing apparatus according to claim 4, wherein the threshold is determined in accordance with a processing capability of a processing apparatus which performs the image processing,
   wherein the at least one memory and at least one processor further function as a second acquiring unit configured to acquire apparatus information on the processing apparatus, and
   wherein the determining unit determines, based on the apparatus information, a plurality of control information corresponding to image processing that can be implemented by the processing apparatus.

9. The information processing apparatus according to claim 1, wherein the first acquiring unit acquires the surface change information in accordance with an instruction from a user, or based on a detection result by a detector which detects a state of the projection surface.

10. The information processing apparatus according to claim 1, wherein the information processing apparatus is configured to output the frame rate control information to outside.

11. The information processing apparatus according to claim 10, wherein the information processing apparatus adds the frame rate control information to image data of the image, and outputs the image data added with the frame rate control information, to the outside.

12. The information processing apparatus according to claim 1, wherein the image processing is warping processing.

13. A projection apparatus comprising at least one memory and at least one processor which function as a plurality of units comprising:
   (1) an acquiring unit configured to acquire surface change information on magnitude of change of a projection surface onto which an image is projected;

(2) a determining unit configured to determine, based on the surface change information, (a) frame rate control information on a frame rate of image processing for maintaining correspondence between each position in the image and each position on the projection surface, (b) gradation control information on a number of bits of an image for which the image processing is performed, and (c) lattice point control information on a number of lattice points that are used for the image processing; and (3) a selection unit configured to allow a user to select followability of the image processing, gradation of the image processing, or transformation accuracy of the image processing, wherein in a case where the followability is selected by the user, the determining unit changes the frame rate control information, the gradation control information, and the lattice point control information which are determined based on the surface change information, so that the frame rate is increased, the number of bits is decreased, and the number of lattice points is decreased, wherein in a case where the gradation is selected by the user, the determining unit changes the frame rate control information, the gradation control information, and the lattice point control information which are determined based on the surface change information, so that the number of bits is increased, the frame rate is decreased, and the number of lattice points is decreased, and wherein in a case where the transformation accuracy is selected by the user, the determining unit changes the frame rate control information, the gradation control information, and the lattice point control information which are determined based on the surface change information, so that the number of lattice points is increased, the frame rate is decreased, and the number of bits is decreased.

14. An information processing method comprising:

acquiring surface change information on magnitude of change of a projection surface onto which an image is projected;

determining, based on the surface change information, (a) frame rate control information on a frame rate of image processing for maintaining correspondence between each position in the image and each position on the projection surface, (b) gradation control information on a number of bits of an image for which the image processing is performed, and (c) lattice point control information on a number of lattice points that are used for the image processing; and allowing a user to select followability of the image processing, gradation of the image processing, or transformation accuracy of the image processing, wherein in a case where the followability is selected by the user, in the determining, the frame rate control information, the gradation control information, and the lattice point control information, which are determined based on the surface change information, are changed so that the frame rate is increased, the number of bits is decreased, and the number of lattice points is decreased, wherein in a case where the gradation is selected by the user, in the determining, the frame rate control information, the gradation control information, and the lattice point control information, which are determined based on the surface change information, are changed so that the number of bits is increased, the frame rate is decreased, and the number of lattice points is decreased, and wherein in a case where the transformation accuracy is selected by the user, in the determining, the frame rate control information, the gradation control information, and the lattice point control information, which are determined based on the surface change information, are changed so that the number of lattice points is increased, the frame rate is decreased, and the number of bits is decreased.

15. A non-transitory computer-readable medium that stores a program, wherein the program causes a computer to execute a method comprising:

acquiring surface change information on magnitude of change of a projection surface onto which an image is projected;

determining, based on the surface change information, (a) frame rate control information on a frame rate of image processing for maintaining correspondence between each position in the image and each position on the projection surface, (b) gradation control information on a number of bits of an image for which the image processing is performed, and (c) lattice point control information on a number of lattice points that are used for the image processing; and allowing a user to select followability of the image processing, gradation of the image processing, or transformation accuracy of the image processing, wherein in a case where the followability is selected by the user, in the determining, the frame rate control information, the gradation control information, and the lattice point control information, which are determined based on the surface change information, are changed so that the frame rate is increased, the number of bits is decreased, and the number of lattice points is decreased, wherein in a case where the gradation is selected by the user, in the determining, the frame rate control information, the gradation control information, and the lattice point control information, which are determined based on the surface change information, are changed so that the number of bits is increased, the frame rate is decreased, and the number of lattice points is decreased, and wherein in a case where the transformation accuracy is selected by the user, in the determining, the frame rate control information, the gradation control information, and the lattice point control information, which are determined based on the surface change information, are changed so that the number of lattice points is increased, the frame rate is decreased, and the number of bits is decreased.

* * * * *